United States Patent [19]
Ito et al.

[11] 3,923,023
[45] Dec. 2, 1975

[54] IGNITION TIMING CONTROL DEVICES FOR AUTOMOTIVE VEHICLES

[75] Inventors: Mikiji Ito, Nagoya; Yoshi Suzuki, Kariya; Kiyohiku Mizuno, Nagoya; Susumu Urano, Kariya, all of Japan

[73] Assignee: Nippondenso Co., Ltd., Kariya, Japan

[22] Filed: Sept. 28, 1973

[21] Appl. No.: 401,715

[30] Foreign Application Priority Data
Sept. 29, 1972 Japan............................. 47-98455
Oct. 11, 1972 Japan...................... 47-118086[U]

[52] U.S. Cl............................................. 123/117 A
[51] Int. Cl.[2]...................................... F02P 5/08
[58] Field of Search...... 123/117 A, 117 R; 335/208

[56] References Cited
UNITED STATES PATENTS

| | | | |
|---|---|---|---|
| 2,650,581 | 9/1953 | Short et al. | 123/117 A |
| 3,596,643 | 8/1971 | Schweitzer | 123/117 A |
| 3,649,936 | 3/1972 | Masuda et al. | 335/208 |
| 3,783,846 | 1/1974 | Barnhart et al. | 123/117 A |
| 3,810,451 | 5/1974 | Fales | 123/117 A |

*Primary Examiner*—Wendell E. Burns
*Assistant Examiner*—David D. Reynolds
*Attorney, Agent, or Firm*—Cushman, Darby & Cushman

[57] ABSTRACT

Ignition timing control devices for automobiles incorporating a vacuum advance circuit is disclosed. A magnetic temperature responsive switch detects the temperature of cooling water flowing from the engine to a radiator wherein the switch is open when the water temperature is between 60°C and about 100°C, with the output of the switch being coupled to a three-way or two-way solenoid valve. The solenoid valve is actuated so that the vacuum advance circuit transmits the negative pressure of the intake air to a diaphragm chamber of a distributor which constitutes part of the vacuum advance mechanism when the temperature of the cooling water is lower than about 60°C or in excess of about 100°C. When the switch is closed, the three-way or two-way solenoid valve is actuated to permit the communication of the diaphragm chamber with the surrounding air. A speed responsive valve is also disclosed which closes when the speed of the vehicle increases past a predetermined level to thereby operate the three-way or two-way solenoid valve to permit vacuum advancing above the predetermined speed level. The efficiency of the vacuum advance mechanism is thereby improved and the reliable operation of the engine is insured.

2 Claims, 6 Drawing Figures

IGNITION TIMING CONTROL DEVICES FOR AUTOMOTIVE VEHICLES

The present invention relates to ignition timing control devices especially adapted for use with used automotive vehicles for diminishing the emission of pollutants such as nitrogen oxides and hydrocarbons.

There has been devised and demonstrated a method for use with used automotive vehicles for communicating a vacuum advance circuit of a distributor with the surrounding atmosphere in order to reduce or eliminate the emission of pollutants such as nitrogen oxides and hydrocarbons. However, this method has a serious defect in that overheating occurs very often. In order to overcome this defect there has been devised and demonstrated a system comprising a thermosensitive change-over immersed in cooling water flowing through a hose from the engine to a radiator and hydraulically coupled to a negative pressure transmission line to the vacuum advance circuit or device of the distributor. When the temperature of cooling water is lower than a normal temperature, the vacuum advance circuit or device is communicated with the surrounding atmosphere but when the temperature of cooling water reaches a predetermined temperature below an overheating temperature, the vacuum advance circuit or device is actuated in response to the negative pressure of the intake air. However when the engine is started, its output is generally low so that the acceleration is not satisfactory unless the vacuum advance circuit or device is actuated. This problem is very serious especially in case of an engine with a small capacity. Generally the emission of nitrogen oxides is very low when the engine is just started so that the temperature is relatively low. Therefore it is unreasonable to deactivate the vacuum advance circuit or device until the temperature of the engine rises to a certain level. In new automotive vehicles their engines incorporate temperature detectors of the type in which the temperature of cooling water is detected so as to control the ignition timing in response to the temperature of cooling water, but these devices are not available for used cars.

SUMMARY OF THE INVENTION

One of the objects of the present invention is therefore to provide an ignition timing control device for an automotive engine which may activate the vacuum advance mechanism until the temperature of the engine rises sufficiently to obtain a desired output and when the temperature rises so high as to cause overheating, but may communicate the vacuum advance mechanism with the surrounding atmosphere when the temperature is within a normal range, thereby reducing the emission of nitrogen oxides and hydrocarbons in an efficient manner.

Another object of the present invention is to provide the ignition timing control devices of the type described and which may be installed even in used automotive vehicles in a very simple manner and at low cost and which incorporate no heat generating element, as opposed to catalytic convertors or afterburners, so that adverse effects on the parts of the automotive vehicles may be completely eliminated.

A further object of the present invention is to provide the ignition timing devices of the type described and which further may control the ignition timing in response to the speed of the automotive vehicle.

A still further object of the present invention is to provide the ignition timing control devices of the type described and which may further retard the ignition timing by controlling the negative pressure acting upon the vacuum advance mechanism without adversely affecting the operation of the engine.

According to the present invention there is providing an ignition timing control device for an automotive engine comprising a thermosensitive switch which includes at least two thermal ferrites with different Curie points and is disposed so as to detect the temperature of the engine; and electromagnetic means adapted, in response to the signal from said thermosensitive switch, to transmit the negative pressure of intake air to a diaphragm chamber of a distributor which is a component part of a vacuum advance mechanism or to communicate said diaphragm chamber with the surrounding air.

As described hereinafter the ignition timing control devices in accordance with the present invention may be easily mounted only by cutting off or replacing a rubber hose interconnecting a radiator and a distributor of an automotive engine incorporating a vacuum advance mechanism which is very effective for reducing the emission of nitrogen oxides and hydrogen carbons causing the photochemical smogs. The devices are simple in construction and inexpensive and have a long service life because they include no part of consumption. Furthermore, as opposed to the catalytic convertors and afterburners incorporating component parts which are heated to high temperatures, the control devices of the present invention have no such components. As a consequence the devices of the present invention will not thermally adversely affect the various component parts of the automotive engines.

In the first embodiment of the present invention, the thermosensitive switch is fixed to the hose joint in such a way that it is closed below a lower predetermined temperature, closed between the lower predetermined temperature nad a higher predetermined temperature, and closed again at the higher temperature. As a result the vacuum advance mechanism is deactivated only when the temperature of the engine, that is the temperature of cooling water is between the lower and higher predetermined temperatures. Thus during the warming up period when the engine output is low so that the emission of pollutants is low, the vacuum advance mechanism is actuated, whereby the reduction of the output may be prevented. In like manner, the vacuum advance mechanism is activated when the temperature of the engine is in excess of the higher predetermined temperature so that the overheating problem may be eliminated. For the attachment of the control device of the present invention, no modification of the engine and its associated parts is required so that the control device may be installed in the used automotive vehicle in a very simple manner. Furthermore, the service life is long, and the safety of the automotive engine will not be adversely affected at all by the installation of the control device.

In the second embodiment of the present invention, the vacuum advance mechanism may be activated or deactivated not only in response to the temperature of the engine but also in response to the traveling speed of the automotive vehicle. Thus the more effective control of the vacuum advance mechanism may be attained.

In the third embodiment of the present invention, the ignition angle may be controlled by controlling the negative pressure acting upon the vacuum advance mechanism so that the effect of the control device upon the operation of the engine may be minimized while the emission of pollutants such as HC, and NOx may be considerably decreased.

The above and other objects, features and advantages of the present invention will become more apparent from the following description of preferred embodiments thereof taken in conjunction with the accompanying drawing.

Figure 1:
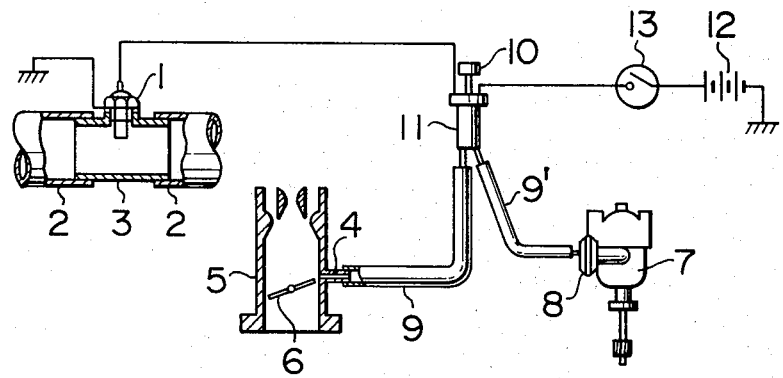
FIG. 1 is a diagrammatic view of a first embodiment of the present invention.
Figure 2:
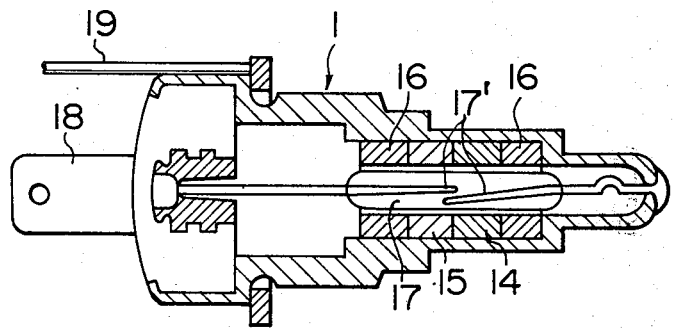
FIG. 2 is a detailed sectional view of a thermosensitive switch shown in FIG. 1.
Figure 3:
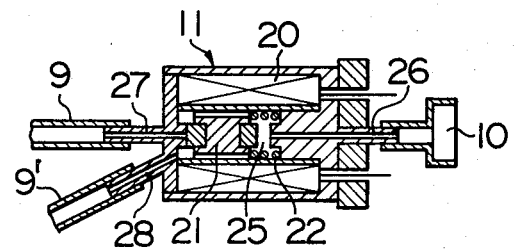
FIG. 3 is a detailed sectional view of a three-way solenoid valve shown in FIG. 1.

DESCRIPTION OF THE PREFERRED EMBODIMENTS:

First Embodiment, FIGS. 1, 2 and 3

Referring to FIGS. 1, 2 and 3 the first embodiment of the present invention will be described hereinafter. A thermosensitive switch 1 is so fixed to a joint 3 joining cooling water hoses 2 between a radiator and an engine (both are not shown) that the thermosensitive switch 1 may be immersed into cooling water flowing through the joint 3. An advancer or vacuum port 4 is formed through the wall of a carburetor 5 in the proximity of a throttle valve 6. A chamber 25 of a three-way valve 11 is communicated with the surrounding atmosphere through an inlet port 26 and a filter 10, and is also communicated with the advancer port 4 through a hose 9 and an inlet port 27. An output port 28 of the three-way valve 11 which is communicated with the chamber 25 is communicated through a hose 9' with a diaphragm chamber 8 of a distributor 7 which constitutes a part of a vacuum advance mechanism. It should be noted that in the prior art engines the advancer port 4 is directly communicated with the diaphragm chamber 8 of the distributor 7 through the rubber hose 9.

As best shown in FIG. 3, the three-way valve 11 includes an electromagnet coil 20 which is electrically coupled to the positive terminals of a battery 12 through a key switch 13 and of the thermosensitive switch 1, whose negative terminal is grounded as shown in FIG. 1.

As shown in FIG. 2 between two permanent magnets 16, which are disposed in series, are interposed two thermal ferrites 14 and 15 whose Curie points are 60°C and 100°C, respectively, and a reed switch 17, which is surrounded by the magnets 16 and the thermal ferrites 14 and 15, has its terminals connected to positive and negative terminals 18 and 19 of the thermosensitive switch 1, respectively. A magnetic circuit is established through reeds 17' of the reed switch 17 when the temperature of cooling water is less than 60°C or in excess of 100°C so that the reeds 17' contact each other, but they are separated from each other when the temperature of cooling water is between 60°C and 100°C because the magnetic circuit is not established through the reeds 17'.

When he coil 20 is energized, a moving core 21 in the three-way valve 11 is attracted to move to the right in FIG. 3 so that the inlet port 26 is closed while the inlet port 27 is communicated with the outlet port 28. On the other hand when the coil 20 is deenergized, the moving core 21 is displaced to the left under the force of a spring 22 so that the inlet port 27 is closed while the inlet port 26 is communicated with the outlet port 28.

Next the mode of operation will be described. First the key switch 13 is closed to start the engine (not shown). Until the temperature of the cooling water reaches 60°C, the temperature sensitive portion including the thermal ferrites 14 and 15 of the thermosensitive switch 1 has a temperature less than 60°C. As a result the reeds 17' contact each other so that the three-way valve 11 is energized. Consequently the advancer port 4 of the carburetor 5 is communicated with the diaphragm chamber 8 of the distributor 7 through the hose 9, the three-way valve 11 and the hose 9' so that the vacuum advance mechanism will not cause the engine to reduce its output. As a result the amount of nitrogen oxides in the exhaust gas is not reduced, but the pollution problem at this stage is not serious because the emission of nitrogen oxides is less when the temperature of the engine is low, that is, when the temperature of cooling water is less than 60°C. However, as the temperature of the engine rises to its normal operating temperature the emission of nitrogen oxides is increased and the engine output is increased. In this case the temperature of cooling water is between 60°C and 100°C so that the reed switch 17 is opened. As a result the three-way valve 11 is de-energized so that the diaphragm chamber 8 of the distributor 7 is communicated through the hose 9', the three-way valve 11, and the filter 10 with the surrounding atmosphere. The vacuum advance mechanism is not actuated so that the advance of spark is retarded. Thus the concentration of nitrogen oxides and hydrocarbons in the exhaust gas may be reduced. Especially, the amount of nitrogen oxides is greatly reduced. However when the spark advance is retarded, the temperature of cooling water rises, especially in summer, so that the output of the engine is reduced. In the worst case, overheating occurs. In order to overcome this problem, the reed switch 17 is adapted to close when the temperature of cooling water is in excess of 100°C so that the three-way valve 11 may be energized again, thereby communicating the advance port 4 with the diaphragm chamber 8. The vacuum advance mechanism is actuated to cool the temperature of cooling water thereby preventing the overheating of the engine.

The experiments conducted by the inventors showed that the magnitude of the current flowing through the three-way valve 11 may be less than a half of the capacity of the reed switch 17 of the thermosensitive switch 1 so that the former is directly coupled to the latter, but it will be understood that a suitable relay may be interposed between the thermosensitive switch 1 and the three-way solenoid valve 11, if required.

Figure 4:
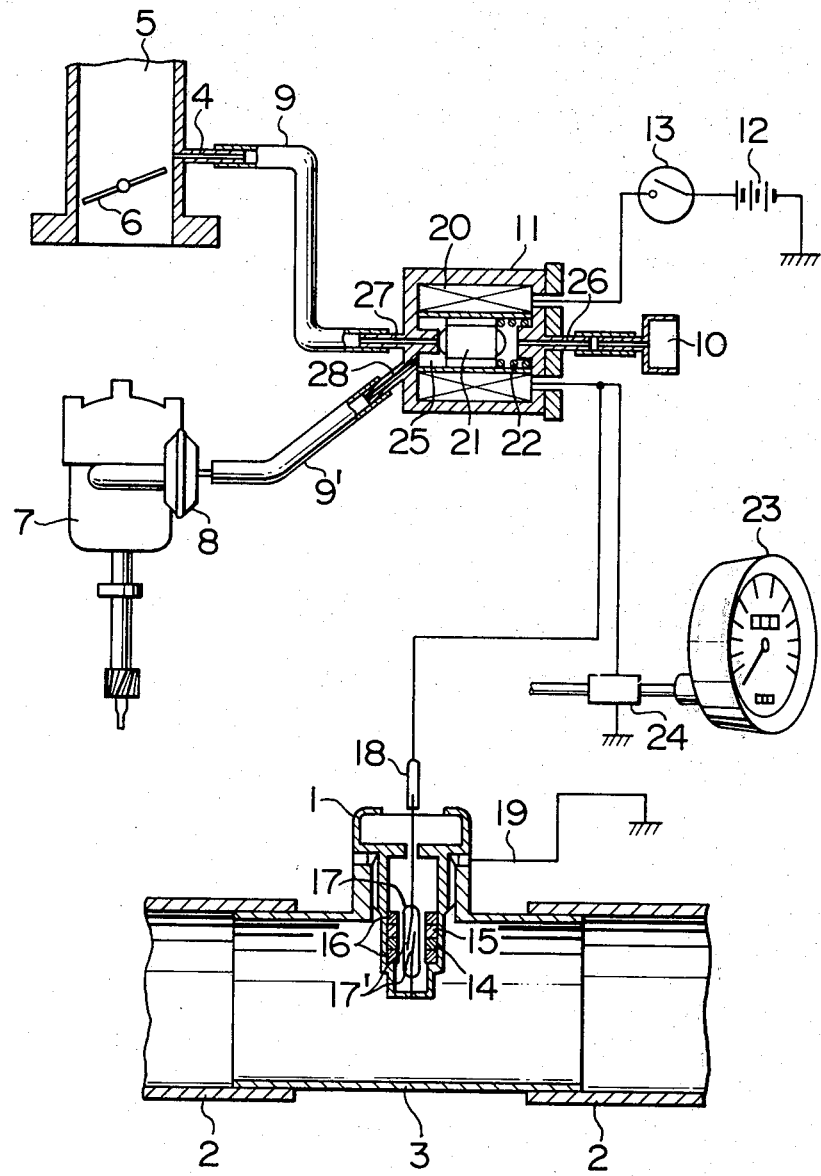
FIG. 4 is a diagrammatic view, partially in section, of a second embodiment of the present invention.

Second Embodiment, FIG. 4

The second embodiment shown in FIG. 4 is substantially similar in construction to the first embodiment described hereinbefore with reference to FIGS. 1, 2 and 3 except that a governor type speed responsive switch 24 is electrically inserted in parallel with the thermosensitive switch 1 and is operatively coupled to a speed meter cable connected to a speed meter 23 in such a manner that the speed responsive switch 24 may be closed when the traveling speed of the vehicle becomes in excess of a predetermined speed, for example 60 Km/Hr. In FIG. 4, parts corresponding to those in FIGS. 1 to 3 are shown by the same numerals.

Next the mode of operation will be described. When the temperature of cooling water is between a predetermined lower temperature, for example 60°C and a predetermined high temperature, for example 100°C, or when the traveling speed does not exceed a predetermined speed, for example 60 Km/Hr, both the switches 17 and 24 are opened so that the three-way valve 11 is de-energized. As a result the diaphragm chamber 8 is in communication with the surrounding atmosphere in the manner described hereinbefore so that the vacuum advance mechanism is not actuated. On the other hand when the temperature of cooling water is less than the predetermined lower temperature or in excess of the predetermined high temperature, or when the traveling speed exceeds the predetermined speed, the reed switch 17 and/or the switch 24 are closed so that the three-way valve 11 is energized. As a result the advancer port 4 is communicated with the diaphragm chamber 8 so that the vacuum advance mechanism is actuated in the manner described hereinbefore.

Figure 5:
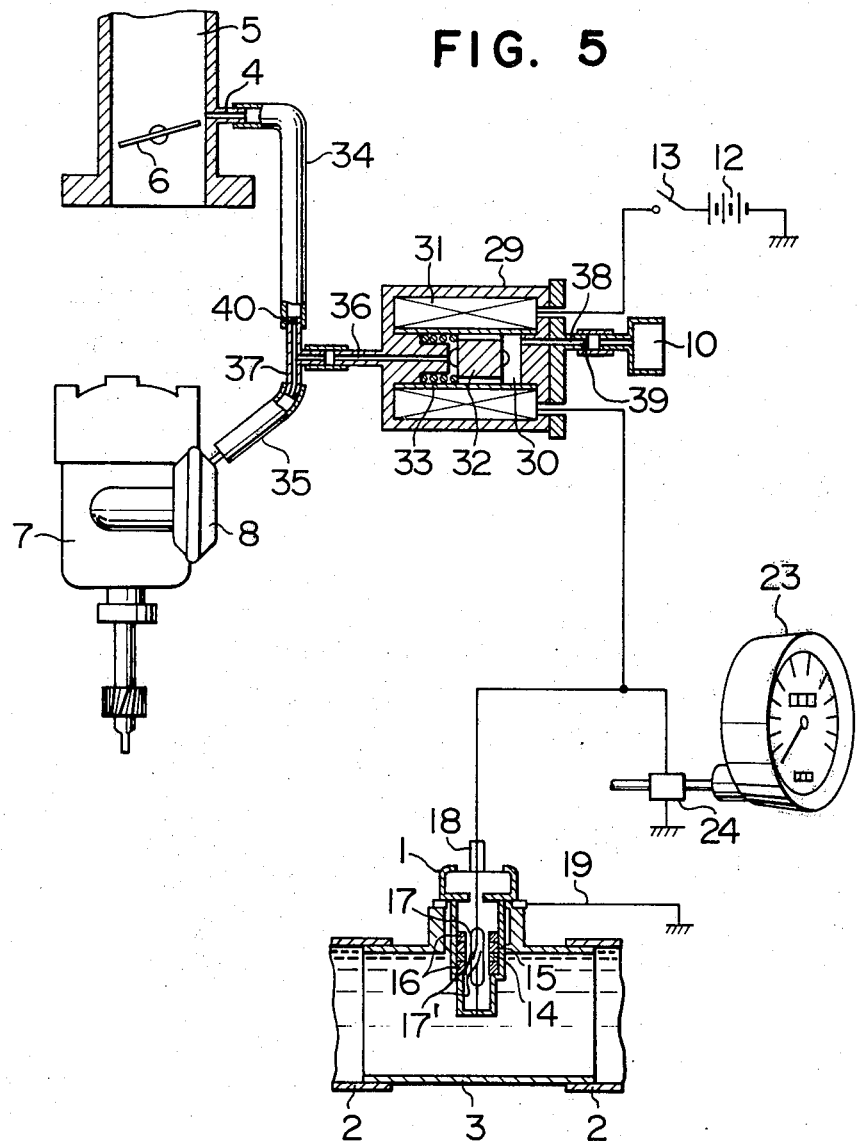
FIG. 5 is a diagrammatic view, partially in section, of a third embodiment of the present invention.
Figure 6:
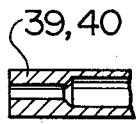
FIG. 6 is a view, on enlarged scale, of an orifice shown in FIG. 5.

Third Embodiment, FIGS. 5 and 6

The third embodiment shown in FIG. 5 is substantially similar in construction to the second embodiment shown in FIG. 4. In FIG. 5, parts corresponding to those in FIG. 4 are shown by the same numerals. In this embodiment, a two-way solenoid valve generally indicated by 29 is used instead of the three-way valve. The two-way valve 29 comprises a chamber 30, a coil 31 electrically coupled to the thermosensitive switch 1 and the governor type speed responsive switch 24, a moving core 32 loaded with a spring 33, an inlet port 38 communicated through an orifice 39 and a filter 10 with the surrounding atmosphere, and an outlet port 36 communicated with the advance port 4 through a hose 34 and a T-joint 37 and with the diaphragm chamber 8 through a hose 35 and the T-joint 37. An orifice 40 is inserted into the hose 34.

Next the mode of operation will be described. When the temperature of cooling water is between a predetermined lower temperature, for example 60°C and a predetermined high temperature, for example 100°C, or when the traveling speed does not exceed a predetermined speed, for example 60 Km/Hr, both the switches 17 and 24 are opened so that the two-way valve 29 is de-energized. As a result the moving core 32 is displaced under the force of the spring 33 to open the outlet port 36 so that the surrounding atmospheric pressure is transmitted to the diaphragm chamber 8 through the filter 10, the orifice 39, the inlet port 38, the chamber 30, the outlet port 36, the T-joint 37 and the hose 35. In this case the pressure at the advancer port 4 is also transmitted through the hose 34, the orifice 40, the T-joint 37 and the hose 35 to the diaphragm chamber 8. Thus the ignition angle is retarded from a normal angle by an angle depending upon the atmospheric pressure and the negative pressure in the proximity of the advancer port 4. The size of these pressures is controlled by the orifices 39 and 40. As a result the emission of pollutants such as nitrogen oxides and hydrocarbons may be reduced. However when the temperature of cooling water is less than the predetermined lower temperature or in excess of the predetermined high temperature, or when the traveling speed exceeds the predetermined speed, the reed switch 17 and/or switch 24 are closed so that the two-way valve 29 is energized. As a result the moving core is attracted against the spring 33 to close the inlet port 36 so that the communication of the diaphragm chamber 8 with the surrounding atmosphere may be interrupted while only the advancer port 4 is communicated with the diaphragm chamber 8. As a result the vacuum advance mechanism is actuated so that the engine ignites at the normal ignition angle.

In the second and third embodiments, the governor type speed responsive switch 24 is used, but it will be understood that an electronic relay which is actuated in response to the signals from a reed switch operatively coupled to a rotary magnet or a small-sized generator may be used. The inlet port of the three-way or two-way valve has been described as being communicated with the surrounding atmosphere through the filter so that the relatively large filter must be used in order to continuously suck air when the vehicle is running at a normal speed. But it will be understood that instead of the filter, the air filter of the engine may be used so that the former may be eliminated. In case of an automotive engine with an automatic choke the three-way or two-way valve may be communicated with a stove hose through a suitable joint. In case of an automotive engine with no automatic choke the three-way or two-way valve may be communicated with the discharge side of an air filter case through a suitable pipe. Furthermore instead of inserting the orifices 39 and 40, the port 36 and the hose 34 may be provided with a reduced diameter portion.

What is claimed is:

1. In an automotive engine including a hose through which cooling water flows from the engine to a radiator and a vacuum advance mechanism having a carburetor and a distributor including a diaphragm chamber, an ignition control device comprising a thermosensitive switch which is fixed to said hose through which cooling water flows from the engine to said radiator and being adapted to detect the temperature of said cooling water, said thermosensitive switch including two permanent magnets disposed in series, two thermal ferrites of which Curie points are about 60°C and about 100°C, respectively, which are interposed between said permanent magnets, and a reed switch at least partially surrounded by said permanent magnets and thermal ferrites, an electromagnetic valve including a chamber formed therein having an atmospheric port through which said chamber is communicated with the surrounding air and an outlet port; a T-shaped conduit communicating said carburetor and said diaphragm chamber with said outlet port of said electromagnetic valve, said electromagnetic valve further including an electromagnetic coil, a spring mounted in said chamber and a moving core contained in said chamber and biased by said spring; a source of electric power, the terminals of said electromagnetic coil being connected between said source of electric power and said switch wherein when said coil is energized said moving core is displaced to close said atmospheric port; and said device further comprising at least one orifice which is inserted into said T-shaped conduit wherein when said temperature of said water is below about 60°C and above about 100°C said switch is closed to energize said electromagnetic coil to close said atmospheric port and thereby advance said distributor by the air pressure of said carburetor and wherein when the temperature of said water is between about 60°C and 100°C said switch is opened to thereby deenergize said electromagnetic coil so that atmospheric pressure and the pressure of said carburetor are both transmitted to said diaphragm chamber.

2. The ignition control device of claim 1 further comprising a speed responsive switching means connected in parallel with said thermosensitive switch for energizing said electromagnetic coil to close said atmospheric port when the speed of said vehicle exceeds a predetermined level.

* * * * *